Dec. 25, 1928.
G. C. CARHART
1,696,623
MOTION TRANSMITTING MECHANISM
Filed May 28, 1926 2 Sheets-Sheet 1
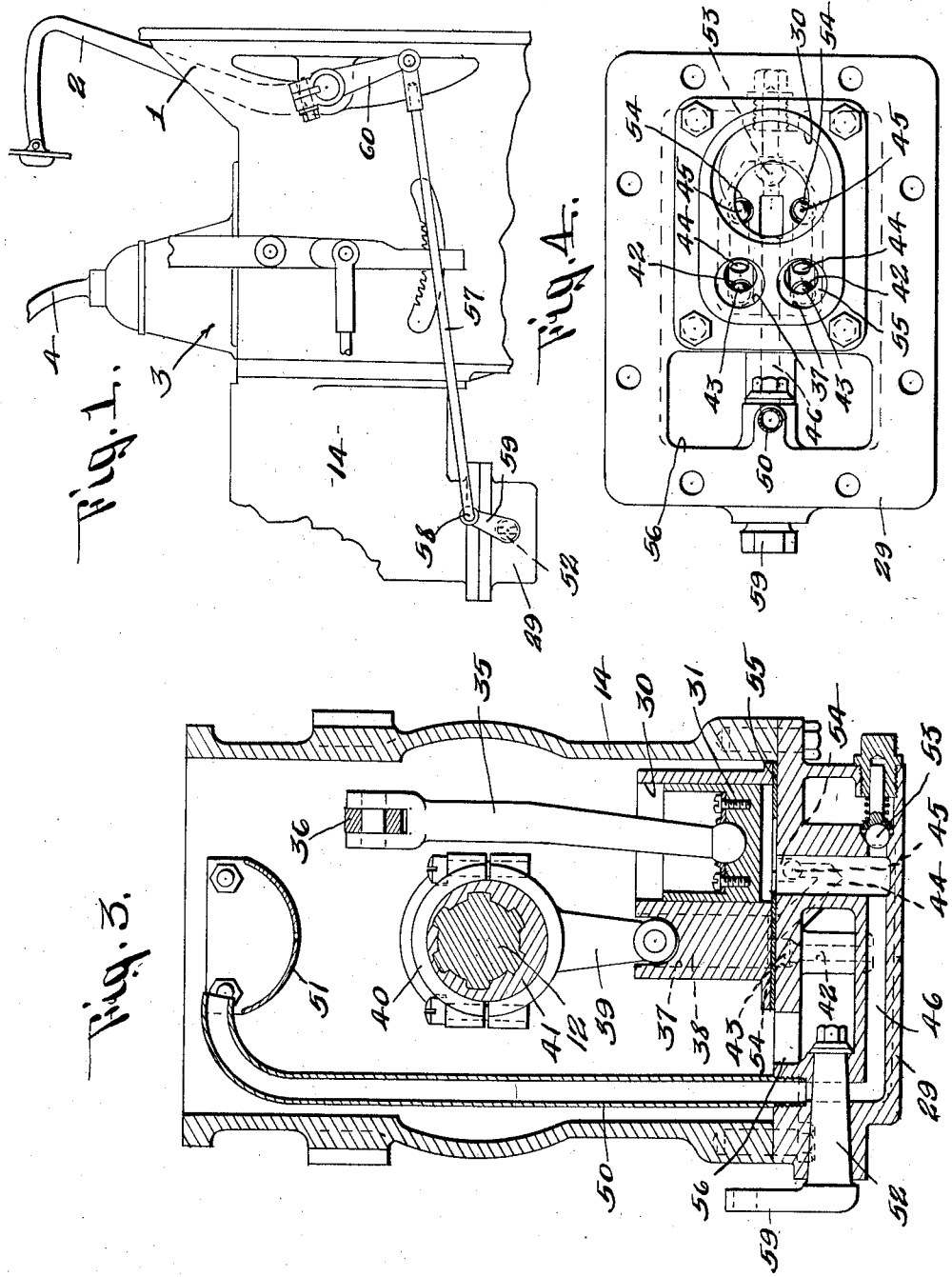
INVENTOR.
George C. Carhart
BY
Parsons & Bordell
ATTORNEYS.

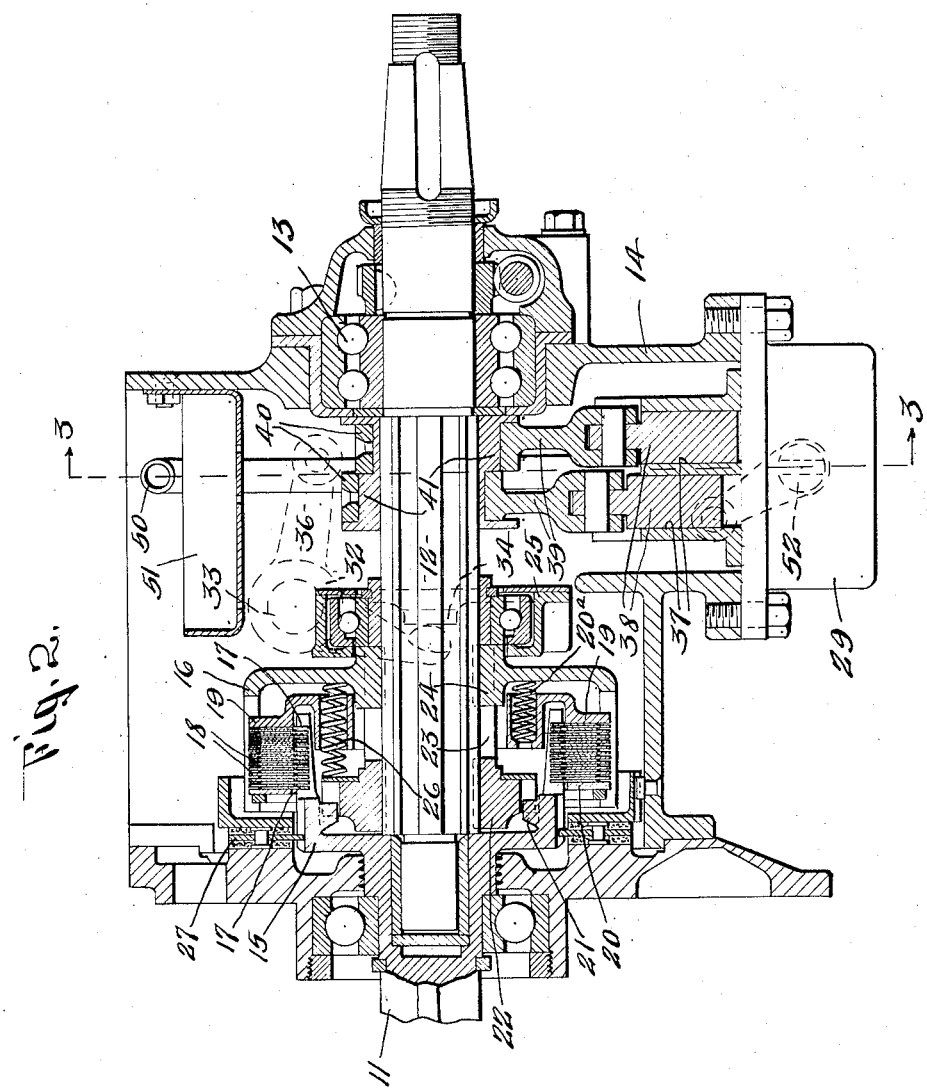

Patented Dec. 25, 1928.

1,696,623

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

MOTION-TRANSMITTING MECHANISM.

Application filed May 28, 1926. Serial No. 112,359.

This invention relates to motion transmitting mechanism, especially mechanism used in motor vehicles and has for its object a particularly simple and efficient means for shifting a clutch of said mechanism, whereby the operator is relieved of the actual work of disengaging the clutch. It relates more particularly to a so-called auxiliary clutch at the rear of the transmission gearing for disconnecting the transmission gearing from the propeller shaft of the vehicle whereby the shifting of the gears is rendered easy owing to the fact that they are relieved of all torque while the shifting is taking place.
The invention consists in the novel features and in the combinations and constructions hereinafter set forth and claimed.

In describing this invention, reference is had to the accompanying drawings in which like characters designate corresponding parts in all the views.

Figure 1 is a diagrammatic side elevation of a transmission mechanism embodying my invention.
Figure 2 is a longitudinal vertical sectional view of the rear clutch and the hydraulic means for operating it.

Figure 3 is a sectional view on line 3—3, Figure 2.
Figure 4 is a plan view of the detached base or reservoir of the housing and parts carried thereby.

This invention comprises generally, driving and driven elements, a normally engaged clutch connecting them including a shiftable section, a pressure operated motor for shifting the shiftable section comprising a movable pressure member connected to the shiftable section, a pump or other pressure creating device for forcing fluid or oil into the pressure operated motor, the pump including a movable member connected to one of said elements usually the driven element to be actuated thereby and a normally open, operator-operated valve for controlling the flow of fluid from the pump to the hydraulic motor, said valve when closed operating to cause the fluid to be forced from the pump into the motor to actuate the pressure member thereof and when open to permit the fluid to escape without exerting pressure on the pressure member of the motor.

As before stated, this invention is shown as applied to the transmission mechanism of motor vehicles which includes the main clutch located in the clutch housing 1 between the engine and the transmission gearing, which clutch is operated by the usual pedal 2, a transmission gearing or gear set 3 including shiftable gears and clutches which are shifted by an operating member as a lever 4 and a rear clutch between the transmission gearing or gear set and the propeller shaft of the vehicle, the rear or auxiliary clutch being operated in synchronism with the front clutch or preliminary to and after gear shifting operations and the operation of such rear clutch is controlled by any part operated during gear shifting operation as the clutch pedal or the gear shifting lever. It is here shown as operated by the clutch pedal.

11 designates the driving element which is the driven shaft of the transmission gearing and 12 the driven element which is a shaft alined with the shaft 11 and having a pilot bearing in the shaft 11, the shaft 12 being journalled at its rear end in a bearing 13 in the housing 14, which housing is mounted on the rear wall of the transmission gear casing. The shaft 12 is connected to the propeller shaft of the vehicle. The shafts 11 and 12 are connected by clutch sections and the clutch here shown is a combined positive and friction clutch.

15 designates the clutch section on the shaft 11, and 16 is a clutch section on the shaft 12, one of these sections preferably, the latter being shiftable axially or having an axially shiftable part.

The section 16 is an outer drum and the section 15 an inner drum and sets of interleaved disks 17, 18 are interlocked respectively with the drums 15 and 16. These disks are acted upon by an axially shiftable section or pressure ring 19 which is thrust to compress the disks against an abutment 20, by a series of springs as the springs 20ª interposed between the head of the drum 16 and the bottoms of sockets in which the springs are located formed in the pressure ring 19. The clutch also includes positively engaged toothed faces and as here shown, the inner drum 15 is formed with internal teeth 21 engaged with external teeth on the section 22 keyed to the shaft 12 and slidable axially thereof. This inner section 22 is formed with a slotted sleeve 23 on the shaft 12, which sleeve extends through suitable passages in the hub 24 of the outer drum 16 to the rear of said hub where it is connected to the throw-out collar 25. The hub 24 of the outer drum 16 has internal projections or splines which extend through the slots of the sleeve 23 and into grooves or keyways in the shaft 12. In short, the hub 24 is splined to the shaft.

Suitable compression springs 26 are interposed between the clutch section 22 and the head of the drum 16, these springs extending though passages in the pressure plate 19.

In operation, as the throw-out collar 25 is moved to the right, it first moves the clutch section 22 to the right disengaging its teeth from the teeth 21 of the clutch section 15. During such movement, the springs 26 are being compressed. During continued movement of the throw-out collar, the section 22 engages or abuts against the pressure ring 19 and shifts it to the right to relieve the disks 17 and 18 so that the disks release. When the pressure applied to the throw-out collar 25 is removed, the springs 26 and 20ª again reengage the clutch. A suitable brake may be provided for retarding the rotation of the shaft 11, this being designated generally 27. As the brake forms no part of this invention, further description is thought to be unnecessary.

The lower part of the housing 14 or a detachable part 29 thereof forms an oil reservoir.

The means for shifting the throw-out collar 25 comprises a fluid or hydraulic motor consisting of a cylinder 30 and a pressure member or piston 31 movable in the cylinder and connected to the throw-out collar to operate it. The connections are here shown as a fork 32 mounted on a rock shaft 33 journalled in the case 14 and coacting with the throw-out collar or a bearing 34 thereon, and a link or connecting rod 35 between the piston 31 and a rock arm 36 on the shaft 33 or the fork 32. This cylinder is mounted on the top plate of the reservoir 29 which reservoir is detachably mounted on the lower side of the housing 14 and this top plate of the reservoir has openings which establish communication with the interior of the housing 14.

The means for forcing the oil into the hydraulic motor or cylinder 30 is here shown as a pair of reciprocating pumps including cylinders 37 mounted on the top plate of the reservoir 29, pistons 38 movable in the cylinders and having connecting rods 39 formed with straps 40 enclosing eccentrics 41 on the shaft 12. The reservoir is formed with suitable inlets 42 leading from the bottom of the reservoir to the cylinders respectively and these inlets have check valves 43 therein. The reservoir is also formed with outlets 44 leading from the pump cylinders and communicating with the motor cylinder 30, these also having check valves 45 therein.

A by-pass leads from the cylinder 30 and discharges into the housing 14 and it is arranged in such position that the oil is discharged onto the parts within the housing 14.

46 designates the by-pass, a portion of which is located within the reservoir 29, the by-pass including a stand pipe 50 extending upwardly in the housing 14 and arranged to discharge into a pan 51 in the upper part of the housing, the pan having drip holes therein in order that the oil may drip onto the mechanism within the housing 14.

A normally open operator-operated valve 52 is located in the by-pass or the portion thereof in the reservoir 29. In operation, this valve is normally open and hence, the pump pumps the oil through the outlets into the cylinder of the hydraulic motor but the oil is free to pass out through the by-pass 46 out through the stand pipe 50. When, however, the valve is operated to close the by-pass, there is no outlet for the oil from the hydraulic motor cylinder 30 and hence the piston 31 is actuated to operate the throw-out collar 25 to disengage the clutch. A suitable relief valve 53 is provided in the reservoir communicating with the by-pass 46 to relieve the pressure when the piston 31 has reached the limit of its movement. When the by-pass valve is again open, the pressure will be relieved and the piston 31 allowed to restore itself to its normal position under the influence of the clutch springs acting on the throw-out collar 25 and through the connections 32, 36 and 35 to the piston 31.

The check valves 43, 45 are here shown as balls located in enlargements as 54 in the inlet and outlet passages of the pump, these enlargements opening through the upper face of the top face of the oil reservoir 29 and the balls are held from displacement by a plate 55 interposed between said top plate and the pump cylinders and having openings therein, the walls of which overhang the enlargements so that the balls are not displaceable upwardly out of the enlargements.

The oil runs back into the reservoir through suitable openings 56 in the top plate of the reservoir 29.

The valve 52 is shown as rotatable and as connected to the pedal 2 to operate in synchronism therewith. It is shown as connected to the pedal 2 by a link 57 connected at its rear end at 58 to a rock arm 59 on the valve 52 and at its front end to a rock arm 60 on the clutch pedal shaft.

What I claim is:

1. In a motion transmitting mechanism, driving and driven elements, a normally engaged clutch connecting them including a shiftable section, a housing having an oil reservoir in the lower part thereof, a pan arranged in the housing above the mechanism therein, a hydraulic motor communicating with the reservoir including a pressure member connected to the shiftable clutch section, a pump arranged to receive oil from the reservoir and connected to one of said elements to be actuated thereby, a by-pass leading from the reservoir and arranged to discharge into said pan and a normally open, operator-operated valve in the by-pass.

2. In a motion transmitting mechanism, the combination of driving and driven shafts, a normally engaged clutch connecting the shafts including a shiftable section, a housing enclosing the clutch sections, and having an oil reservoir, one of the shafts extending into the housing, a pump in the housing connected to the reservoir and including a movable member, connections located in the housing between the movable pump member and one of the shafts, a hydraulic motor located in the housing and connected to the pump to receive oil therefrom, connections between the motor and shiftable clutch section, an outlet leading from the motor, and an operator-controlled, normally-open valve in said outlet.

3. In a motion transmitting mechanism, the combination of driving and driven shafts, a normally engaged clutch connecting the shafts including a shiftable section, a housing enclosing the clutch sections, and having an oil reservoir, one of the shafts extending into the housing, a pump in the housing connected to the reservoir and including a movable member, connections located in the housing between the movable pump member and one of the shafts, a hydraulic motor located in the housing and connected to the pump to receive oil therefrom, connections between the motor and shiftable clutch section, an outlet leading from the motor, and an operator-controlled normally-open valve in said outlet, the outlet discharging into the housing.

4. In a motion transmitting mechanism, the combination of driving and driven shafts, normally engaged clutches connecting the shafts including a shiftable section, a housing enclosing the clutch sections and forming an oil reservoir, one of the shafts extending into the housing, a pump in the housing, connected to the reservoir and including a movable member, connections located in the housing between the movable pump member and one of the shafts, a hydraulic motor located in the housing and connected to the pump to receive oil therefrom, connections between the motor and the shiftable clutch section, an outlet leading from the motor, and an operator-controlled, normally-open valve in said outlet, the reservoir being located in the lower part of the housing and the outlet comprising a pipe discharging into the upper part of the housing.

5. In a motion transmitting mechanism, the combination of a housing, driving and driven shafts rotatable in the housing, a normally engaged clutch connecting the shafts including a shiftable section, the housing having an oil reservoir located in the lower part thereof and detachably connected to the housing, one of the shafts extending into the housing, a pump mounted on and detachable from the reservoir and including a movable member, a connection located in the housing between the movable member and said shaft, a hydraulic motor including a member mounted on the reservoir within the housing and a movable member connected to the shiftable clutch section to shift the same, the reservoir being formed with an outlet passage and an intake passage leading to the pump, and a passage connecting the pump and the motor, the outlet passage being arranged as a by-pass around the motor, and a normally open operator-controlled valve in the outlet passage, the valve being carried by the reservoir.

6. In a motion transmitting mechanism consisting of a housing, driving and driven shafts rotatable in the housing, a unitary structure comprising clutch sections mounted on the shafts in the housing, one clutch section being shiftable into and out of engagement with the other, the housing having an oil reservoir, a pump and motor mechanism comprising fixed members carried by the reservoir in the housing, and movable members, connections located in the housing between the movable pump member and one of the shafts, and connections between the movable motor member and the shiftable clutch section, an inlet passage for the pump communicating with the reservoir, an outlet passage for the pump communicating with the motor, a by-pass leading from the motor and discharging into the housing, and a normally open, operator-controlled valve in the by-pass.

In testimony whereof, I have hereunto signed my name, at Syracuse, in the county of Onondaga, and Sate of New York, this 26th day of May, 1926.

GEORGE C. CARHART.